United States Patent
St. Clair et al.

[11] Patent Number: 5,840,828
[45] Date of Patent: Nov. 24, 1998

[54] POLYIMIDE FIBERS

[75] Inventors: Terry L. St. Clair, Poquoson; Catharine C. Fay, Yorktown; Dennis C. Working, Norfolk, all of Va.

[73] Assignee: The United States of America as represented by the Administrator of the National Aeronautics and Space Administration, Washington, D.C.

[21] Appl. No.: 858,201

[22] Filed: May 7, 1997

Related U.S. Application Data

[60] Provisional application No. 60/021,206 Jul. 3, 1996.

Related U.S. Application Data

[62] Division of Ser. No. 689,760, Aug. 13, 1996, Pat. No. 5,670,256.

[51] Int. Cl.$^6$ .......................... C08G 73/10; D02G 3/00; D01F 6/04; D01F 6/00

[52] U.S. Cl. .......................... 528/353; 528/170; 528/310; 528/322; 428/364; 428/395; 264/176.1; 264/178 F; 264/182; 264/184; 264/185; 264/203; 264/205; 264/206; 264/210.8; 264/211.14; 264/211.16; 264/234

[58] Field of Search ...................... 528/310, 170, 528/322, 353; 428/395, 364; 264/203, 234, 205, 176.1, 210.8, 211.14, 211.16, 182, 184, 185, 178 F, 206

[56] References Cited

U.S. PATENT DOCUMENTS

| | | | |
|---|---|---|---|
| 5,147,966 | 9/1992 | St. Clair et al. | 528/188 |
| 5,248,471 | 9/1993 | Kanesh | 264/203 |
| 5,670,256 | 9/1997 | St. Clair et al. | 428/364 |

*Primary Examiner*—P. Hampton-Hightower
*Attorney, Agent, or Firm*—Hillary T. Womack; George F. Helfrich

[57] ABSTRACT

A polyimide fiber having textile physical property characteristics and the process of melt extruding same from a polyimide powder. Polyimide powder formed as the reaction product of the monomers 3,4'-ODA and ODPA, and end-capped with phthalic anhydride to control the molecular weight thereof, is melt extruded in the temperature range of 340° C. to 360° C. and at heights of 100.5 inches, 209 inches and 364.5 inches. The fibers obtained have a diameter in the range of 0.0068 inch to 0.0147 inch; a mean tensile strength in the range of 15.6 to 23.1 ksi; a mean modulus of 406 to 465 ksi; and a mean elongation in the range of 14 to 103%.

11 Claims, No Drawings

POLYIMIDE FIBERS

CROSS REFERENCE

This is a divisional of application Ser. No. 08/689,760 filed on Aug. 13, 1996 U.S. Pat. No. 5,670,256.

ORIGIN OF THE INVENTION

The invention described herein was jointly made by an employee of the United States Government and contract employees in the performance of work under NASA contracts. In accordance with 35 USC 202, the contractors elected not to retain title.

This application claims the benefit of U.S. Provisional Application No. 60/021,206, filed Jul. 3, 1996.

FIELD OF THE INVENTION

This invention relates generally to the extrusion preparation of fibers and relates specifically to the preparation of polyimide fibers having enhanced flow and high mechanical properties.

BACKGROUND OF THE INVENTION

High performance polyimides are used in the aerospace industry, for example, in joining metals to metals, or metals to composite structures. In addition, polyimides are rapidly finding new uses as matrix resins for composites, molding powders and films. These materials display a number of performance characteristics such as high temperature and solvent resistance, improved flow for better wetting and bonding, high modulus, chemical and hot water resistance, and the like. Another area of application is in the manufacture of lighter and stronger aircraft and spacecraft structures.

U.S. Pat. No. 5,147,966 (St. Clair, et al) discloses a polyimide that can be melt processed into various useful forms such as coatings, adhesives, composite matrix resins and film. This polyimide is prepared from 3,4'-oxydianiline (3,4'-ODA) and 4,4'-oxydiphthalic anhydride (ODPA) in various organic solvents. The use of phthalic anhydride as an endcapping agent is also disclosed in this patent to control the molecular weight of the polymer and, in turn, to make it easier to process in molten form.

In the present invention, a polyimide fiber is produced from the polyimide powder that is prepared from the 3,4'-ODA and ODPA monomers. This polyimide powder was endcapped with phthalic anhydride, as described in U.S. Pat. No. 5,147,966, to control the number average molecular weight in the range of 10,000 g/mole to 20,000 g/mole.

The need for polyimide fibers of this type are apparent. Since this polyimide is fire resistant, these fibers would be useful in manufacturing articles which might be exposed to flames/fire to prevent their burning. These articles would range from clothing articles to aerospace components. In addition, fibers from this polyimide, since they are thermoplastic, could be co-mingled with reinforcing media such as glass fiber, graphite fiber, inert fillers, and the like, and be subsequently melted, in-situ, to form composite structures which would have utility in fire-resistant applications in the automotive and aerospace industries.

A primary requirement for such fibers is that they have adequate textile properties to permit processing using normal textile equipment. The two primary measures of fiber quality are tensile strength and elongation-to-break percentage. Adequate strength must be developed to afford handling properties during processing and to afford adequate strength in the final form. Additionally, the fiber must possess adequate elongation-to-break properties to provide the required toughness in the processing operations and in the final components.

SUMMARY OF THE INVENTION

The invention is a polyimide fiber formed from the reaction product of 3,4'-oxydianiline (3,4'-ODA) and 4,4'-oxydiphthalic anhydride (ODPA) in 2-methoxyethyl ether (diglyme), or other suitable solvent, and endcapped with phthalic anhydride to control the number average molecular weight in the range of 10,000 g/mole to 20,000 g/mole.

It is an object of the present invention to provide a polyimide fiber that has the textile physical property characteristics to permit processing into useful articles using normal textile equipment.

Another object of the present invention is polyimide fiber having high strength and high elongation-to-break property characteristics.

A further object of the present invention is a process for preparing polyimide fibers via melt extrusion of a molten polyimide.

An additional object of the present invention is a process for making polyimide fibers over a range of processing conditions which produce fibers having high strength and high elongation-to-break properties.

Another object of the present invention is a process for preparing polyimide fibers that exhibit mechanical properties that permits them to be used in various commercial applications.

Still another object of the present invention is to provide polyimide fibers having fire resistant properties.

DESCRIPTION OF THE PREFERRED EMBODIMENTS

The invention and its advantages are illustrated by the specific examples given below. Conditions for melt spinning/extrusion are detailed in the individual examples and a comparison of resulting mechanical properties are shown in the data Tables 1–3.

The polyimide powder employed in each of the specific examples was the reaction product of 3,4'-ODA and 4,4'-ODPA endcapped with phthalic anhydride to control the number average molecular weight of the polymer powder in the range of 10,000 g/mole to 20,000 g/mole. This polyimide powder was obtained commercially as LaRC™-IA from IMITEC, Inc., 1990 Maxon Road, Schenectady, N.Y. 12308.

In each example below, the LaRC™-IA polyimide powder, as received, was dried in an air oven at approximately 200° C. for twenty-four hours prior to use to drive off any residual solvent and/or moisture. The melt extrusion was performed using a Barbender, single screw extruder, equipped with a NASA-LaRC drive unit, and provided with a 8-filament, 0.0135 inch vertical die. The extrusion rate employed was 10 revolutions per minute (rpm).

Polyimide fibers were extruded from three heights to vary the diameter of the fiber: (1) 364.5 inches, (2) 209 inches, and (3) 100.5 inches. Three processing temperatures were also utilized: 340° C., 350° C. and 360° C.

The following specific Examples are provided for purposes of illustration, and are not intended to serve as limitations of the invention.

EXAMPLES

Example I

The oven dried LaRC™-IA powder was placed in the sample feed of the single screw melt extruder. The extrusion temperature was 340° C. with an extrusion rate of 10 rpm. The fiber exited through the 0.0135 inch diameter slit and fell 30 feet, 4.5 inches (364.5 inches). The average final fiber diameter was 0.0094 inch. Mean tensile strength, modulus, and elongation were 22.7 ksi, 412 ksi, and 103%, respectively.

Example II

The oven dried LaRC™-IA powder was placed in the sample feed of the single screw melt extruder. The extrusion temperature was 350° C. with an extrusion rate of 10 rpm. The fiber exited through the 0.0135 inch diameter slit and fell 30 feet, 4.5 inches (364.5 inches). The average final fiber diameter was 0.0068 inch. Mean tensile strength, modulus, and elongation were 23.1 ksi, 436 ksi, and 102%, respectively.

Example III

The oven dried LaRC™-IA powder was placed in the sample feed of the single screw melt extruder. The extrusion temperature was 360° C. with an extrusion rate of 10 rpm. The fiber exited through the 0.0135 inch diameter slit and fell 30 feet, 4.5 inches (364.5 inches). The average fiber diameter was 0.0071. Mean tensile strength, modulus, and elongation were 20.8 ksi, 415 ksi, and 84%, respectively.

The mechanical properties of the melt-extruded fibers obtained from a height of 364.5 inches in Examples I–III are tabulated in TABLE I.

TABLE I

| Processing Temperature, °C. | Average Fiber Diameter, Inch | Mean Tensile Strength, ksi | Mean Modulus, ksi | Mean Elongation, % |
|---|---|---|---|---|
| 340 | 0.0094 | 22.7 | 412 | 103 |
| 350 | 0.0068 | 23.1 | 436 | 102 |
| 360 | 0.0071 | 20.8 | 415 | 84 |

Example IV

The oven dried LaRC™-IA powder was placed in the sample feed of the single screw melt extruder. The extrusion temperature was 340° C. with an extrusion rate of 10 rpm. The fiber exited through the 0.0135 inch diameter slit and fell 17 feet, 5 inches (209 inches). The average final fiber diameter was 0.0094 inch. Mean tensile strength, modulus, and elongation were 20.9 ksi, 406 ksi, and 79%, respectively.

Example V

The oven dried LaRC™-IA powder was placed in the sample feed of the single screw melt extruder. The extrusion temperature was 350° C. with an extrusion rate of 10 rpm. The fiber exited through the 0.0135 inch diameter slit and fell 17 feet, 5 inches (209 inches). The average final fiber diameter was 0.0101 inch. Mean tensile strength, modulus, and elongation were 20.6 ksi, 448 ksi, and 65%, respectively.

Example VI

The oven dried LaRC™-IA powder was placed in the sample feed of the single screw melt extruder. The extrusion temperature was 360° C. with an extrusion rate of 10 rpm. The fiber exited through the 0.0135 inch diameter slit and fell 17 feet, 5 inches (209 inches). The average final fiber diameter was 0.0117 inch. Mean tensile strength, modulus, and elongation were 17.7 ksi, 441 ksi, and 34%, respectively.

The mechanical properties of the melt-extruded fibers obtained from a height of 209 inches in Examples IV–VI are tabulated in TABLE II.

TABLE II

| Processing Temperature, °C. | Average Fiber Diameter, Inch | Mean Tensile Strength, ksi | Mean Modulus, ksi | Mean Elongation, % |
|---|---|---|---|---|
| 340 | 0.0104 | 20.9 | 406 | 79 |
| 350 | 0.0101 | 20.6 | 448 | 65 |
| 360 | 0.0117 | 17.7 | 441 | 34 |

Example VII

The oven dried LaRC™-IA powder was placed in the sample feed of the single screw melt extruder. The extrusion temperature was 340° C. with an extrusion rate of 10 rpm. The fiber exited through the 0.0135 inch diameter slit and fell 8 feet, 4.5 inches (100.5 inches). The average fiber diameter was 0.0147 inch. Mean tensile strength, modulus, and elongation were 19.9 ksi, 433 ksi, and 50%, respectively.

Example VIII

The oven dried LaRC™-IA powder was placed in the sample feed of the single screw melt extruder. The extrusion temperature was 350° C. with an extrusion rate of 10 rpm. The fiber exited through the 0.0135 inch diameter slit and fell 8 feet, 4.5 inches (100.5 inches). The average final fiber diameter was 0.0118 inch. Mean tensile strength, modulus, and elongation were 17.3 ksi, 463 ksi, and 28%, respectively.

Example IX

The oven dried LaRC™-IA powder was placed in the sample feed of the single screw melt extruder. The extrusion temperature was 360° C. with an extrusion rate of 10 rpm. The fiber exited through the 0.0135 inch diameter slit and fell 8 feet, 4.5 inches (100.5 inches). The average final fiber diameter was 0.0115 inch. Mean tensile strength, modulus, and elongation were 15.8 ksi, 465 ksi, and 14%, respectively.

The mechanical properties of the melt-extruded fibers obtained from a height of 100.5 inches in Examples VII–IX are tabulated in TABLE III.

TABLE III

| Processing Temperature, °C. | Average Fiber Diameter, Inch | Mean Tensile Strength, ksi | Mean Modulus, ksi | Mean Elongation, % |
|---|---|---|---|---|
| 340 | 0.0147 | 19.9 | 434 | 50 |
| 350 | 0.0118 | 17.3 | 463 | 28 |
| 360 | 0.0115 | 15.6 | 465 | 14 |

The foregoing specific Examples are given to illustrate the principal of the invention and are not intended to serve as limitations thereof. There are many variations and modifications of the invention that will be readily apparent to those skilled in the art in the light of the above teachings. It is therefore to be understood that, within the scope of the pending claims, the invention may be practiced other than as specifically described herein.

What is claimed as new and desired to be secured by Letters Patent of the United States is:

1. A method of making a polyimide fiber comprising the steps of:
   (a) reacting 3,4'-oxydianiline and 4,4'-oxydiphthalic anhydride to produce a polyimide powder;
   (b) drying the polyimide powder in an air oven at approximately 200° C. for twenty-four hours;
   (c) placing the dried polyimide powder in a single screw extruder and heating the extruder contained polyimide powder to a melt processing temperature from about 340° C. to about 360° C.;
   (d) equipping the single screw extruder with a eight-filament, 0.0135 inch vertical die;
   (e) selecting the height of the extruder from about 100.5 inches to about 364.5 inches;
   (f) employing a rate of ten revolutions per minute for the single screw extruder; and
   (g) recovering a polyimide fiber from the extruder having an average fiber diameter from about 0.0094 inch to about 0.0147 inch.

2. The method of claim 1 wherein the height of the extruder is 364.5 inches and the recovered polyimide fiber has an average fiber diameter from about 0.0068 inch to about 0.0094 inch; a mean tensile strength from about 20.8 ksi to about 23.1 ksi, a mean modulus of 412 ksi to 436 ksi and a mean elongation from about 84 to about 103 percent.

3. The method of claim 1 wherein the height of the extruder is 209 inches and the recovered polyimide fiber has an average fiber diameter of 0.01010 inch to 0.0117 inch; a mean tensile strength from about 17.7 to about 20.9 ksi; a mean modulus from about 406 to about 442 ksi; and a mean elongation from about 34 to about 79 percent.

4. The method of claim 1 wherein the height of the extruder is 100.5 inches and the recovered polyimide fiber has an average fiber diameter of 0.0115 inch to 0.0147 inch; a mean tensile strength of 15.6 ksi to 19.9 ksi; a mean modulus of 434 ksi to 465 ksi; and a mean elongation of 14 to 50 percent.

5. A method of making a polyimide fiber by melt extrusion of a polyimide powder formed of the reaction product of 3,4'-oxydianiline and 4,4'-oxydiphthalic anhydride.

6. The method of claim 5 wherein the melt extrusion of the polyimide powder is performed at a polyimide temperature from about 340° C. to about 360° C.

7. The method of claim 5 wherein the polyimide powder is endcapped with phthalic anhydride to control the polymer molecular weight.

8. The method of claim 7 wherein the number average molecular weight of the polymer powder is from about 10,000 g/mole to about 20,000 g/mole.

9. The method of claim 8 wherein the diameter of the polyimide fiber is from about 0.0068 to about 0.0147 inch and the melt extrusion is carried out at a height from about 100.5 inches to about 364.5 inches.

10. The method of claim 8 wherein the polyimide fiber has a mean modulus from about 406 to about 465 ksi.

11. The method of claim 8 wherein the polyimide fiber has a mean elongation from about 14 to about 103%.

* * * * *